United States Patent Office 3,538,017
Patented Nov. 3, 1970

3,538,017
PROCESSING SPENT CATALYSTS
Giancarlo Aglietti, Pietro Baratella, and Luigi Lugo, Milan, Italy, assignors to Societa Italiana Resine S.p.A., Milan, Italy
No Drawing. Filed Oct. 16, 1967, Ser. No. 675,298
Claims priority, application Italy, Oct. 26, 1966, 29,292/66
Int. Cl. B01j 11/02
U.S. Cl. 252—415      2 Claims

ABSTRACT OF THE DISCLOSURE

An exhausted, solid catalyst containing iron and molybdenum oxides, employed for oxidizing methanol to formaldehyde, is processed to yield a molybdenum-containing solution usable for preparing a fresh catalyst. The exhausted catalyst is ground and calcined, the calcinate is treated with excess aqueous ammonia to solubilize the molybdenum content; the molybdenum-containing solution is then heated to evaporate part of the ammonia until the molar ratio $NH_3/MoO_3$ in the solution sinks to 0.9–1.1; this solution is used for preparing the fresh catalyst.

---

This invention concerns a method of processing spent catalysts essentially comprising metal oxides, employed in oxidation of alcohols to aldehydes, more particularly methanol to formaldehyde.

Catalysts of this type containing molybdenum and iron oxides have long been known in the art and have been obtained from dilute solutions of their corresponding salts in the form of complex alkali precipitates which, after washing, filtering and drying, are moulded to suitable shape and size and conditioned at a high temperature.

A serious drawback of these catalysts is their marked tendency towards disintegration. For this reason methods of preparation have been developed by which a product of adequate mechanical strength is obtained though maintaining high properties of effectiveness and selectivity.

U.S. Pat. 3,459,807, issued Aug. 5, 1969 discloses preparation of an unsupported catalyst containing molybdenum and iron oxides, of extensive specific surface and high mechanical properties suitable for prolonged use in oxidation of alcohols to aldehydes, more particularly methanol to formaldehyde.

U.S. Pat. 3,464,931, issued Sept. 2, 1969 discloses preparation of an unsupported catalyst containing molybdenum and iron oxides, modified by the addition of minor amounts of a compound which substantially corresponds to cobalt and/or nickel molybdate and having a specific area 2 to 3 times greater than the specific area of the abovementioned non-modified catalyst, such that it can be brought to the form of hollow pellets possessing a high mechanical strength and involving a very reduced pressure drop in operation.

These catalysts, which can be exploited in a plant during over approximately 6 and 12 months, respectively, are discharged after use and treated to recover their components, more particularly molybdenum, in the form of a product which is directly suitable for use in a further synthesis of the catalyst, particularly according to the two prior patents mentioned herein before, the specifications of which are here understood as forming part of this disclosure as far as the preparation of a fresh catalyst from the product recovered by the method of this invention is concerned.

Economy of the oxidation process of the alcohols to aldehydes is affected by the method of recovering the catalyst, more particularly the yield of recovery of molybdenum, on account of the high cost of the latter.

The main object of the invention is to provide a method of processing catalysts containing molybdenum and iron oxides, modified or not by addition of minor amounts of a compound substantially corresponding to cobalt and/or nickel molybdate, whereby molybdenum can be recovered in a practically total manner.

A further object of the invention is to provide a method which is simple and economically convenient for processing the above-mentioned catalysts for recovery purposes.

Further objects of the invention will be understood from the following description and experimental example hereafter.

According to the invention, the exhausted catalyst containing iron and molybdenum oxides is ground to dust form aind calcined at a temperature preferably ranging between 350° and 450° C. during 15 to 30 hours. This treatment can be usefully carried out in a furnace in the presence of a slight current of air, the catalyst being arranged in layers of a depth not exceeding about 4 cm.

After calcination the powdered catalyst is treated with an aqueous solution of ammonia, the amounts of the reagents being such that the molar ratio $NH_3/MoO_3$ is between 3 and 15.

This reaction can be carried out in a stirred reactor by adding the powdered catalyst to the aqueous ammoniacal solution and maintaining the temperature at the value of room temperature or slightly higher values; in practice, this reaction can be carried out at temperatures from 20° to 40° C. The time period within which the powdered catalyst is added is dependent upon the heat effects of the reaction and imposed temperature and is followed by an ageing period preferably exceeding 2 hours. During this attack by aqueous ammoniacal solution air or another oxygen-containing gas is advantageously caused to flow through the mass.

By the above described heat treatment of the powdered catalyst and flow of an oxygen-containing gas through the reacting mass, solutions of molybdenum compounds are obtained which are free from contamination by iron compounds.

The insoluble residue is then separated by filtering, the filter cake being repeatedly washed with a dilute aqueous ammoniacal solution.

The various filtrates brought together are submitted to prolonged boiling in order to distill ammonia. Operation is preferably carried out in the presence of a slight flow of gas, such as air, and it is further possible to operate at a superatmospheric pressure, if desired.

The vapors evolving from the solution at this step of the reaction are condensed and recovered, whereby an aqueous ammoniacal solution is obtained which may be usefully employed in a subsequent recovery run for washing the cake from the hereinbefore described filtering step. During the ammonia distillation the boiling solution is advantageously admixed with amounts of water, which may be added either continuously or discontinuously, in order to avoid reaching dryness.

The treatment is continued till the molar ratio $NH_3/MoO_3$ in the solution falls to between 0.9 and 1.1. In practice, this value is attained when the aqueous solution of the molybdenum salt, with an $MoO_3$ content of about 4.9% by weight, is of a pH within the range 5.6–5.9.

The solution obtained from the above sequence of operations is directly employed in the synthesis of the catalyst by the method described by the patents referred to above.

With an iron and molybdenum oxide containing catalyst modified by the addition of minor amounts of a compound substantially corresponding to cobalt or nickel molybdate, the powdered catalyst is additionally treated, after calcining, with a dilute aqueous solution of hydrochloric acid at boiling temperature during a period of 1 to 3 hours.

The amount of hydrochloric acid employed should exceed the stoichiometrically required amount for forming the corresponding cobalt (or nickel) chlorides, but should be smaller than the amount required for also forming iron chlorides.

After treatment with hydrochloric acid the suspension is allowed to cool, filtered and the filter cake is washed with deionized water down to a content of chlorine ions in the wash water lower than 0.01%, by weight.

The subsequent treatment is the same as for a catalyst containing molybdenum and iron oxides only.

By these processes molybdenum recovery yields were obtained which exceeded 96% with the modified catalyst and 97% for the catalyst containing iron and molybdenum oxides only.

EXAMPLE 300 kg. exhausted catalyst containing iron and molybdenum oxides, with an 8% by weight $MoO_3$ content were finely ground and heated in layers of 3 cm. thickness in an oven during 24 hours at about 420° C. in a slight air current. After cooling the powdered catalyst was introduced during a period of about 2 hours into a stirred aqueous ammoniacal solution, was made up of 1300 liters of about 30% ammonia diluted with 1300 liters water. The temperature was maintained at about 30° C. by cooling during addition, the mixture being subsequently further maintained at the same temperature during 3 hours while continuously stirring. During this ageing period air was blown through the mixture. The latter was subsequently filtered and the filter cake was washed with 6 batches each of 400 liters aqueous ammoniacal solution, the ammonia concentration amounting to about 2% by weight.

The filtrates brought together were distilled at atmospheric pressure till the volume of the liquid decreased to about 1300 liters. Boiling was continued while gradually adding batches of 400 liters of water and evaporating every time to bring the solution to the above-mentioned value of about 1300 liters. This treatment was repeated 16 times. At the end about 1250 liters of a solution with a 17.5% $MoO_3$ content were obtained. By diluting a small fraction down to an $MoO_3$ content of 4.9% a solution of pH 5.75 was obtained. The body of the solution obtained was directly employed for synthesis of fresh catalyst.

We claim:

1. A method of processing exhausted solid catalyst containing iron and molybdenum oxides, said catalyst employed in the oxidation of an alcohol to its corresponding aldehyde, which comprises:

converting said solid catalyst to powder form, calcining the powder exhausted catalyst in the presence of an air stream at a temperature within the range of from about 350° C. to about 450° C. for a time in the range of from about 15 to about 30 hours, the catalyst being arranged in layers of a depth not exceeding about 3 cm., treating the powder calcined catalyst with an aqueous ammonia solution, the molar ratio of $NH_3/MoO_3$ being within the range of from about 3/1 to about 15/1, said treatment being at a temperature of 20° C. to 40° C., aging the mixture of said powdered calcined catalyst with said aqueous ammonia solution for a time greater than about 2 hours, filtering the mixture of said powdered calcined catalyst and said aqueous ammonia solution after aging to thereby yield a filter cake, washing said filter cake thus obtained with an aqueous ammonia solution, boiling the filtrate obtained from said filtering, thereby distilling ammonia therefrom until a $NH_3/MoO_3$ ratio within the range of from about 0.9 to about 1.1 and pH within the range of from about 5.6 to about 5.9 is obtained, and reusing the solution thus obtained for preparing fresh oxidation catalyst.

2. The process of claim 1 wherein said exhausted catalyst additionally contains a minor amount of a compound substantially corresponding to the molybdate of a metal from the group consisting of nickel and cobalt, said process further comprising the additional step of removing from the powdered calcinate said metal from the group consisting of nickel and cobalt in the form of a soluble chloride by treating said powdered calcinate with aqueous hydrochloric acid.

References Cited

UNITED STATES PATENTS

| | | | |
|---|---|---|---|
| 2,204,193 | 6/1940 | Spicer et al. | 252—412 |
| 2,668,798 | 2/1954 | Plank | 252—413 |
| 2,812,310 | 11/1957 | Walker et al. | 252—470 |
| 2,973,326 | 2/1961 | Hodgins et al. | 252—412 |
| 3,152,997 | 10/1964 | Natta et al. | 252—470 |
| 3,341,470 | 9/1967 | Hensley | 252—412 |
| 3,403,112 | 9/1968 | Sze et al. | 252—470 |
| 3,408,309 | 10/1968 | Gessner | 252—470 |
| 3,420,783 | 1/1969 | Bergstrand | 252—470 |

DANIEL E. WYMAN, Primary Examiner

PAUL E. KONOPKA, Assistant Examiner

U.S. Cl. X.R.

252—412; 260—603